United States Patent
Sotgiu

(10) Patent No.: US 7,743,812 B2
(45) Date of Patent: Jun. 29, 2010

(54) APPARATUS FOR FITTING OR REMOVING A PNEUMATIC TIRE TO OR FROM A RIM OF A VEHICLE WHEEL

(75) Inventor: Paolo Sotgiu, Modena (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 28 days.

(21) Appl. No.: 12/007,801

(22) Filed: Jan. 15, 2008

(65) Prior Publication Data
US 2008/0179014 A1    Jul. 31, 2008

(30) Foreign Application Priority Data
Jan. 15, 2007    (EP) .................................. 07000692

(51) Int. Cl.
*B60C 25/138*    (2006.01)
(52) U.S. Cl. ..................................... 157/1.24
(58) Field of Classification Search ................ 157/1.17, 157/1.22, 1.24, 1.26, 1.28
See application file for complete search history.

(56) References Cited

U.S. PATENT DOCUMENTS 7,048,026 B2 * 5/2006 Bonacini .................... 157/1.28
7,500,504 B2 * 3/2009 Bonacini .................... 157/1.17

FOREIGN PATENT DOCUMENTS

| EP | 1 593 533 B1 | | 9/2005 |
| EP | 1 714 807 A1 | | 10/2006 |
| IT | MO20060274 | * | 12/2006 |

OTHER PUBLICATIONS

European Search Report issued in European Patent Application No. 07 000 692.9, mailed Jun. 18, 2007.

* cited by examiner

*Primary Examiner*—D. S Meislin
(74) *Attorney, Agent, or Firm*—McDermott Will & Emery LLP

(57) ABSTRACT

An apparatus for fitting or removing tyre to or from a rim 1 of a vehicle wheel comprising a hooked tool 2 which is controlledly moved in a pivotal connection location 4 along a sliding guide 11 and in a second pivotal connection location connected to a link lever, on a tool holder 5, wherein the control movement of a rod-shaped control portion 10 is transmitted to the tool 2 by way of the gear transmission 9.

12 Claims, 2 Drawing Sheets

APPARATUS FOR FITTING OR REMOVING A PNEUMATIC TIRE TO OR FROM A RIM OF A VEHICLE WHEEL

FIELD OF THE INVENTION

The invention concerns an apparatus for fitting or removing a pneumatic tyre to or from a rim of a vehicle wheel.

BACKGROUND OF THE INVENTION

An apparatus of that kind is known from EP 1 593 533 A2. The known apparatus includes a hooked tool which is mounted movably to a tool holder by way of parallel links in two pivotal connection locations. The one end of the tool is in the form of a hooked engagement end and engages the tyre bead when removing the pneumatic tyre from the rim. Disposed at the other end of the tool is a pivotal connection location which is hingedly connected to the tool holder by way of one of the two link levers. At its one end the link lever is connected to the pivotal connection location and at its other end it is non-rotatably connected to a gear which belongs to a gear transmission mounted on the tool holder. The gear transmission has a further gear which is mounted rotatably to the tool holder and which can be caused to rotate by means of a control portion, to control the tool movement. A second pivotal connection location disposed between the two ends of the tool is supported on the tool holder by way of a second link lever. A relatively large number of hingedly interconnected components are required for controlling the movement of the tool when fitting and removing the pneumatic tyre.

SUMMARY OF THE INVENTION

The object of the invention is to provide an apparatus of the kind set forth in the opening part of this specification, in which the controlled tool movement is achieved with a simple movement control device.

According to the invention that object is attained by the features of claim 1. The appendant claims recite advantageous developments of the invention.

The invention provides that the pivotal connection location which is disposed at the tool end in opposite relationship to the hooked engagement end is guided in a sliding guide fixed to the tool holder. The pivotal connection location disposed between the two tool ends is connected to a gear of the gear transmission by way of a link lever, that gear being fixed non-rotatably to the end of the link lever. The two gears of the gear transmission are mounted rotatably to the tool holder, in particular to the downward end of the approximately vertically arranged tool holder, for example on an actuating plate.

The invention provides that the rotary movement transmitted by a control portion to the gear transmission is transmitted to the gear which is connected non-rotatably to the link lever which is pivotally connected approximately at the centre of the tool. In the movement of the tool therefore, the control movement and also the application of force which is required to lift the tyre bead off the rim is applied to the tool closer to the hooked engagement location than in the state of the art. The other pivotal connection location of the tool on the tool holder, which is at the end of the tool in opposite relationship to the hooked engagement location, is supported and guided in the sliding guide on the tool holder. That sliding guide is of an arcuate configuration and preferably extends around the pivot axis of the gear of the gear transmission, to which the movement of the control portion is transmitted preferably by way of an actuating lever to which the gear is non-rotatably fixed.

BRIEF DESCRIPTION OF THE DRAWINGS

The invention will be described in further detail by means of an embodiment by way of example with reference to the Figures in which.

DETAILED DESCRIPTION OF THE INVENTION

Figure 1:
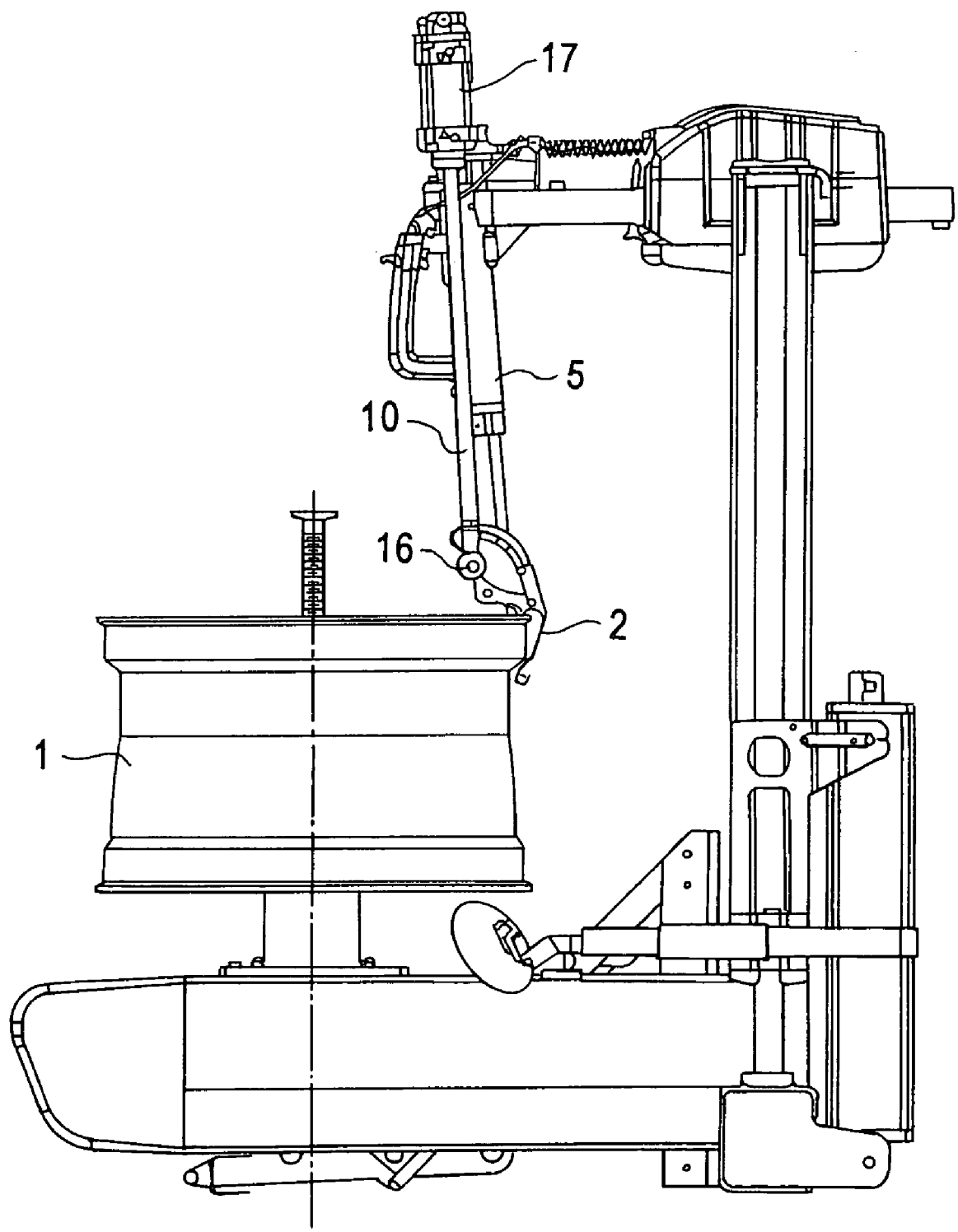
FIG. 1 shows a fitting/removal machine for pneumatic tyres of motor vehicle wheels.

Referring to FIG. 1, shown therein is a fitting/removal machine with which pneumatic tyres can be fitted on to rims of motor vehicle wheels and removed from the rims. The illustrated machine has a rotary mounting for a motor vehicle wheel or a rim 1 of a motor vehicle wheel. In the fitting and removal operation, the rim 1 or the wheel, which is clamped fast, can be rotated by means of a motor disposed in the machine housing. A tool holder 5 which extends in a vertical direction is held on a machine frame and a cantilever arm. Disposed at the other end of the tool holder 5 is a tool 2 with which a pneumatic tyre (not shown) can be removed from the rim 1. Details of the tool and the control of the movement thereof are described hereinafter with reference to FIGS. 2 and 3.

The tool 2 which preferably serves to remove the pneumatic tyre from the rim 1 is shaped at its one end (the lower end) to provide a hooked engagement end 12. That is adjoined by a tool portion which extends substantially in a straight line and which ensures that the hooked engagement end 12 can be moved into the rim bed for the purposes of engaging the tyre bead. That tool portion is fixedly connected to a tool portion having pivotal connection locations 3 and 4. The tool 2 is hingedly supported on the tool holder 5 by way of the pivotal connection locations 3 and 4.

Disposed at the upper end 13 of the tool 2, that is to say the end of the tool which is in opposite relationship to the hooked engagement end 12, is the pivotal connection location which is guided in a sliding guide 11. One or more rollers can be provided in the pivotal connection location 4, to provide for low-friction guidance, wherein the roller or rollers are to be moved with a rolling motion in the sliding guide 11. In the illustrated embodiment the sliding guide 11 is in the form of a curved slot. It is also possible to use an open sliding surface or the like as the sliding guide 11. The sliding guide can also be in the form of a curved guide edge or sliding guide channel.

The second pivotal connection location 3 is supported on the tool holder 5 by way of a link lever 6. The one end of the link lever 6 is connected hingedly to the tool 2 in the pivotal connection location 3. The other end of the link lever 6 is connected non-rotatably to a gear 7. The gear 7 is mounted rotatably to the tool holder 5.

A second gear 8 which meshes with the gear 7 is also mounted rotatably to the tool holder 5. The two gears 7 and 8 form a gear transmission. An actuating lever 15 is connected non-rotatably to the gear 8 and is connected at a pivot 16 to a control portion 10. The control portion 10 is of a rod-shaped configuration and can be actuated hydraulically or pneumatically by an actuating device 17 (see FIG. 1) in the form of a piston-cylinder assembly. The actuating device 17 and the rod-shaped control portion 10 are mounted pivotably to the cantilever arm of the machine in such a way that the lower end of the control portion 10 which is connected at the pivot 16 to the gear 8 by way of the actuating lever 15 can perform a part-circular movement within a given angular range. That rotary movement is transmitted to the gear 7 and from there by way of the link lever 6 to the pivotal connection location 3 on the tool 2. The pivotal connection location 3 is disposed between the two ends of the tool 2, at which the hooked engagement end 12 and the other pivotal connection location 4 are provided.

The sliding guide 11 is of an arcuate configuration and extends around the compact arrangement of the transmission 9, possibly approximately about the axis of rotation 14 of the gear 8. When the stroke movement of the rod-shaped control portion 10 takes place, the lower end of the control portion 10 and the pivot 16 are pivoted, in which case, as already discussed above, that pivotal movement is transmitted by way of the gear transmission 9 to the pivotal connection location 3. In that case the tool 2 can be moved between the two limit positions which are shown in FIGS. 2 and 3.

Figure 3:
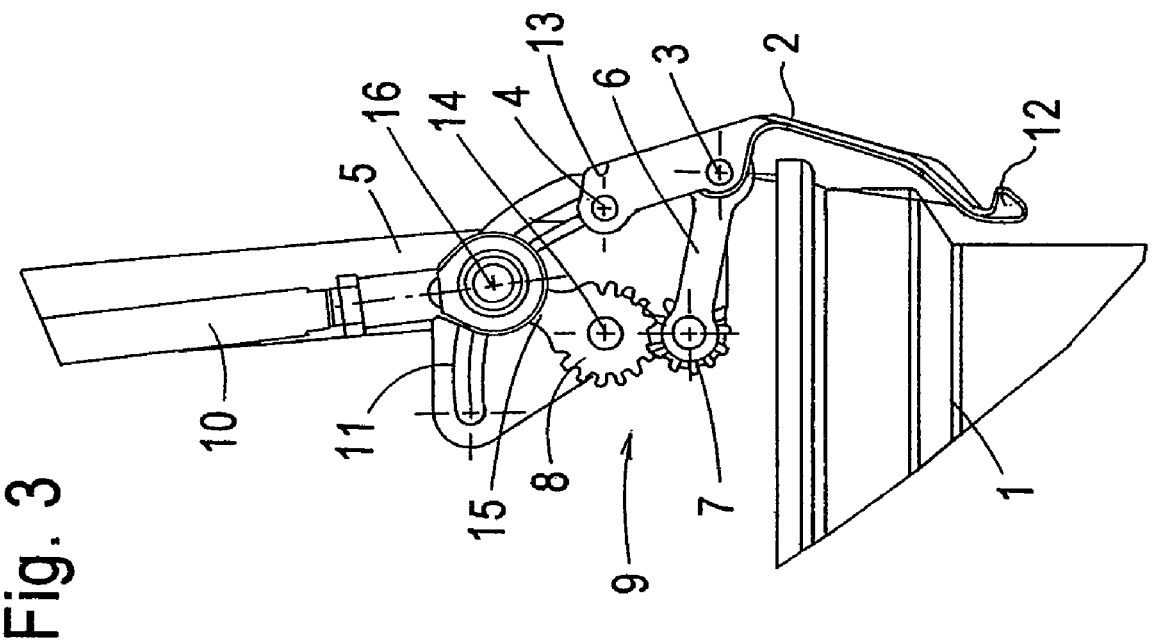
FIG. 3 shows the apparatus shown in FIG. 1 in a second operating position.
Figure 2:
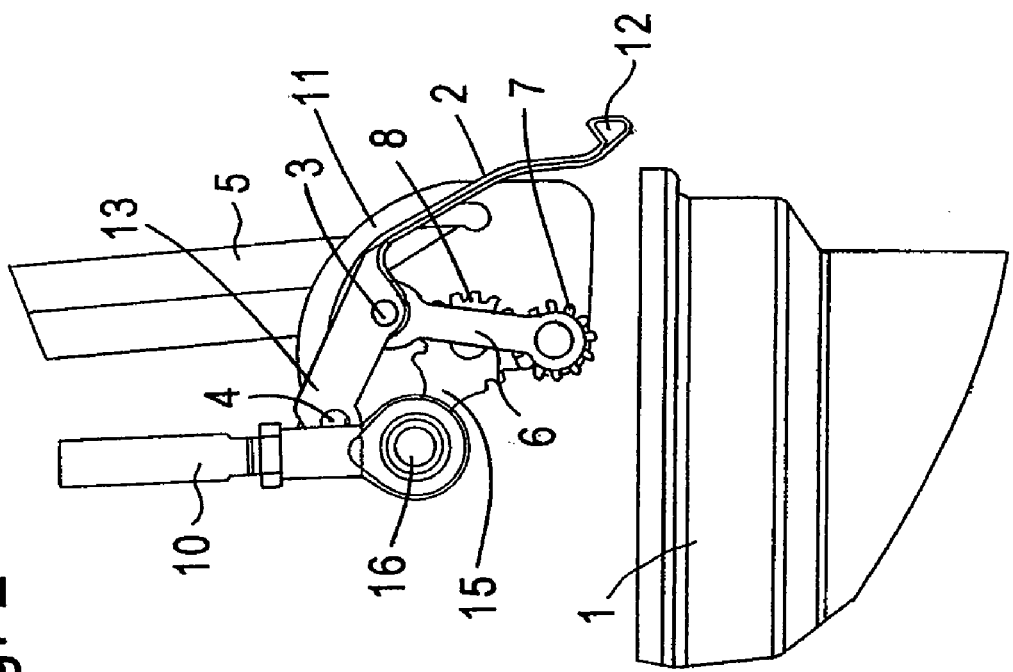
FIG. 2 shows a side view of an embodiment of an apparatus for removing a pneumatic tyre in a first operating position, which is used in the machine shown in FIG. 1.

FIG. 2 shows the rest position and FIG. 3 shows the position in which the tool and in particular the hooked engagement end 12 of the tool 2 is brought into position between the rim and the tyre for engaging the tyre bead. Corresponding pivotal movement of the pivot 16 at the lower end of the control portion 10 out of the position shown in FIG. 3 into the position shown in FIG. 2 provides that the corresponding rotary movement is transmitted by way of the gear transmission 9 to the pivotal connection location 3 on the tool 2. In that case the tool 2 is moved into the position shown in FIG. 2, with the pivotal connection location 4 being moved along the curved sliding guide 11. The pivotal connection location 3 is pivoted about the axis of rotation of the gear 7. The controlled movement of the tool 2 is further achieved by the pivotal connection location 3 being pivoted about the pivotal connection location 4 which is moved along the sliding guide 11.

In that movement, the tyre bead is lifted off the rim 1 so that the tyre can be removed from the rim 1. In the opposite movement, the hooked engagement end 12 is moved between the rim 1 and the tyre in order to engage the tyre bead.

As the tool 2 in the case of the invention is guided on the tool holder 5 exactly on a given trajectory, it is also possible to provide for guiding the movement of the tool 2 in such a way as to treat the rim and the tyre carefully and gently.

LIST OF REFERENCES 1 rim
2 tool
3 pivotal connection location
4 pivotal connection location
5 tool holder
6 link lever
7 gear
8 gear
9 gear transmission
10 control portion
11 sliding guide
12 hooked engagement end
13 tool end
14 axis of rotation
15 actuating lever
16 pivot
17 actuating device

The invention claimed is:

1. Apparatus for fitting or removing a pneumatic tyre to or from a rim (1) of a vehicle wheel comprising a hooked tool (2) which is mounted movably to a tool holder (5) in two pivotal connection locations (3, 4), wherein the one pivotal connection location (3) is connected by way of a link lever (6) to a gear (7) of a gear transmission (9) mounted on the tool holder (5), and a control portion (10) connected to a further gear (8) of the gear transmission (9) for controlling the tool movement, said gear (7) is connected to said further gear (8) such that said gear transmission (9) forms a mechanical connection between said control portion (10) and said one pivotal connection location (3), wherein the other pivotal connection location (4) is guided in a sliding guide (11) fixed to the tool holder (5) so as to be movable from a first end of the sliding guide (11) to a second end of the sliding guide (11) when said control portion (10) moves said one pivotal connection location (3) via said mechanical connection.

2. Apparatus according to claim 1 characterized in that the pivotal connection location (4) which is guided in the sliding guide (11) is provided at the end (13) of the tool (2), that is in opposite relationship to a hooked engagement end (12).

3. Apparatus according to claim 1 or claim 2 characterized in that the pivotal connection location (4) connected to the link lever (6) is disposed between the two ends (12, 13) of the tool (2).

4. Apparatus according to claim 1 characterized in that the one end of the link lever (6) is connected non-rotatably to the gear (7) and the other end of the link lever (6) is connected pivotably to the one pivotal connection location (3) which is disposed between the two ends (12, 13) of the tool (2).

5. Apparatus according to claim 1 characterized in that the sliding guide (11) is of a curved configuration.

6. Apparatus according to claim 1 characterized in that the configuration of the sliding guide (11) is curved around the gear transmission (9) and in particular around the axis of rotation (14) of the gear (8) which is connected to the control portion (10).

7. Apparatus according to claim 1 characterized in that the control portion (10) is connected to the gear (8) by way of an actuating lever (15) connected non-rotatably to the gear (8).

8. Apparatus according to claim 1 characterized in that the control portion (10) is connected pivotably to an actuating lever (15).

9. Apparatus according to claim 1 characterized in that an actuating lever (15) is connected non-rotatably to the gear (8) of the gear transmission.

10. Apparatus according to claim 1 characterized in that the one pivotal connection location (3) provided between two tool portions (12, 13) is pivotable about a pivot axis of the link lever (6) and about the other pivotal connection location (4) which is guided along the sliding guide (11).

11. Apparatus according to claim 1 characterized in that the sliding guide (11) is formed by an open guide surface or guide edge.

12. Apparatus according to claim 1 characterized in that the sliding guide (11) is formed by a curved slot or sliding guide channel.

* * * * *